United States Patent [19]
Anderson

[11] 3,758,613
[45] Sept. 11, 1973

[54] HYDROGEN FLUORIDE-CATALYZED ALKYLATION WITH A VENTURI-SHAPED REACTOR

[75] Inventor: Robert F. Anderson, La Grange Park, Ill.

[73] Assignee: Universal Oil Products Company, Des Plains, Ill.

[22] Filed: June 3, 1971

[21] Appl. No.: 149,594

[52] U.S. Cl. .......................................... 260/683.48
[51] Int. Cl. ............................................... C07c 3/54
[58] Field of Search .................. 260/683.43, 683.58, 260/683.59, 683.53, 683.52, 683.57, 683.47, 683.48

[56] References Cited
UNITED STATES PATENTS

| | | | |
|---|---|---|---|
| 3,169,152 | 2/1965 | Van Pool et al. | 260/683.48 |
| 3,213,157 | 10/1965 | Hays et al. | 260/683.48 |
| 3,133,128 | 5/1964 | McDonald | 260/683.48 |
| 3,435,092 | 3/1969 | Hutson, Jr. et al. | 260/683.48 |
| 3,249,649 | 5/1966 | Sherk et al. | 260/683.48 |

Primary Examiner—Delbert E. Gantz
Assistant Examiner—G. J. Crasanakis
Attorney—James R. Hoatson, Jr. and Robert W. Erickson

[57] ABSTRACT

A process and apparatus for producing an alkylation reaction product from an alkylatable reactant and an olefin-acting reactant utilizing a fluid catalyst. The reactants are introduced into a catalyst stream flowing vertically through a venturi-shaped chamber, the mixture of catalyst and reactants so formed is charged through the venturi-shaped chamber into a retention chamber, and the effluent from the retention chamber is separated in a settling chamber to provide a catalyst phase and a reaction products phase. The product is recovered in the reaction products phase.

6 Claims, 7 Drawing Figures

Patented Sept. 11, 1973

INVENTOR:
Robert F. Anderson

BY: *James R. Hoatson, Jr.*
*Robert W. Erickson*

ATTORNEYS

Patented Sept. 11, 1973 3,758,613

INVENTOR:
Robert F. Anderson

BY: James P. Hoatson, Jr.
Robert W. Erickson
ATTORNEYS

HYDROGEN FLUORIDE-CATALYZED ALKYLATION WITH A VENTURI-SHAPED REACTOR

BACKGROUND

In one aspect, this invention relates to a process for alkylating an alkylatable reactant with an olefin-acting reactant utilizing a fluid catalyst. In another aspect, this invention relates to a novel apparatus to be utilized in producing an alkylation reaction product. More specifically, this invention relates to an alkylation process for producing an improved alkylation reaction product by charging a fluid catalyst to the lower part of a vertically disposed venturi-shaped zone and passing the catalyst vertically through the zone, introducing a mixture of alkylatable reactant and olefin-acting reactant into the vertically flowing stream of catalyst in the venturi-shaped zone at a vertical velocity about that of the catalyst stream or less, charging the effluent from the venturi-shaped zone directly into a vertically disposed retention zone in open communication with the venturi-shaped zone, charging the effluent from the retention zone to a vertically disposed separation zone in open communication with the retention zone, and separating the retention zone effluent into a reaction products phase and a catalyst phase, and recovering the alkylation reaction product in the reaction products phase. This invention also relates, more specifically, to a novel alkylation apparatus comprising in combination a vertically disposed venturi-shaped chamber having fluid inlet means in the lower, upstream part thereof for introducing catalyst therein and having fluid inlet means for introducing reactants therein, a vertically extended retention chamber connected to, and in open communication with the upper, downstream part of the venturi-shaped chamber, and a vertically extended settling chamber connected to, and in open communication with, the upper, downstream end of the retention chamber having fluid outlet means at the upper, downstream end thereof for withdrawing catalyst. In one limited aspect, this invention relates to a process and apparatus for producing an improved isoparaffin-olefin alkylation reaction product having excellent anti-knock properties and usable as a motor fuel component.

Among the most important products of fluid catalyzed alkylation processes is the motor fuel alkylate produced by alkylating an isoparaffin with an olefin. The most commonly utilized isoparaffin is isobutane and the olefin utilized generally comprises propene and butenes. Because of its excellent antiknock properties, this alkylate is often blended with less valuable fuel components in order to increase the octane rating of the blended fuels to a level adequate for use in modern automobile motors. Prior art alkylation processes produce an alkylate which has a sufficiently high octane rating for use in upgrading the octane of other fuel components when the alkylate is treated with octane improving compounds, primarily alkyl leads such as tetraethyl and tetramethyl lead. In order to produce a lead free motor fuel, the alkylate used to provide an adequate octane rating must be of high enough octane to compensate for the loss in octane rating which has previously been provided by the alkyl lead compounds. The higher octane alkylate required in unleaded fuels is difficult to provide efficiently using prior art processes and apparatus.

In a general embodiment, the necessary procedure for any alkylation process comprises contacting the reactants and catalyst, maintaining the components in contact for a sufficient period of time, and then separating the catalyst from the reaction product and the remaining reactants. In isoparaffin-olefin alkylation processes utilizing a hydrogen fluoride catalyst, it has been found that the particular methods used to contact the reactants and catalyst plays a part in determining the quality and yield of the reaction product produced in the process. Various solutions have been proposed to the continuing problem of more efficiently performing this contacting function and to the problem of integrating the mixing function with the other necessary functions of the process including an adequate contact time and efficient separation of the catalyst from the products. For example, mixing of reactants and catalyst has been accomplished by spraying the reactants into the catalyst at high velocity through small diameter nozzles, or by educting catalyst through small diameter orifices with high velocity streams of reactants. These and other methods, which have been disclosed as solutions to the problem of efficiently contacting catalyst and reactants, suffer from the same inherent defect, which is that they produce an uneven and undesirably high concentration of the reactants in the catalyst at the critical point where the reactants initially contact the catalyst. This inefficient contact has the effect of decreasing the yield of the desired reaction product and of increasing the fraction of undesirable side products created in the process. The process and apparatus of the present invention provide an alkylation method which does not suffer from this defect, and, therefore, makes possible an alkylation process giving a higher yield of the desired reaction product with decreased production of undesirable side products.

SUMMARY OF THE INVENTION

Accordingly, it is an object of this invention to provide a process for producing an improved alkylation reaction product. Another object of this invention is to provide a novel alkylation apparatus. Still another object of this invention is to provide an improved method for contacting reactants and catalyst in a fluid-catalyzed alkylation process.

In an embodiment, this invention relates to a process for producing an alkylation reaction product from an alkylatable reactant and an olefin-acting reactant, ulitizing a fluid catalyst which comprises the steps of: (a) introducing said catalyst into the lower part of a vertically disposed venturi-shaped zone maintained at alkylation reaction conditions and passing said catalyst vertically through said venturi-shaped zone; (b) introducing said reactants into said venturi-shaped zone at a vertical velocity about the same or less than the vertical velocity of said catalyst in said venturi-shaped zone; (c) passing the effluent from said venturi-shaped zone directly into a vertically extended retention zone maintained at alkylation reaction conditions and in open communication with said venturi-shaped zone; (d) passing the effluent from said retention zone directly into a vertically extended separation zone, maintained at separation conditions and in open communication with said reaction zone, and separating said reaction zone effluent into a reaction products phase and a catalyst phase; and, (e) withdrawing said reaction products phase and said catalyst phase from said separation zone and recovering said product in said reaction products phase.

In another embodiment, this invention relates to an alkylation apparatus comprising in combination: (a) a vertically extended, venturi-shaped chamber having fluid inlet means at the upstream end thereof for introducing catalyst therein and fluid inlet means for introducing reactants therein; (b) a vertically extended retention chamber communicating with and connected to the downstream end of said venturi-shaped chamber; (c) a vertically extended settling chamber communicating with and connected to the downstream end of said retention chamber having fluid outlet means at the downstream end thereof for withdrawing reaction product and reactants and having fluid outlet means on the periphery thereof for withdrawing catalyst.

My invention provides an alkylation process and apparatus which produce the desired alkylation reaction product efficiently and in high yield, overcoming problems inherent in previously disclosed processes and apparatus, which problems have been caused by the uneven and harmful distribution and concentration of reactants in the catalyst during the period when the reaction mixture is initially formed from the reactants and catalyst. In the process and apparatus of the present invention, the reactants are introduced into a stream of catalyst which is moving rapidly in a vertical direction through a venturi-shaped chamber. The reactants are introduced into the rapidly moving catalyst stream at a vertical velocity about the same or lower than that of the catalyst. This method of contacting the catalyst and reactants provides a uniform and desirably low concentration of reactants in the reaction mixture, and results in higher yields of the desired product from the reactants utilized.

The present invention can be more clearly understood by reference to the accompanying drawings.

DESCRIPTION OF THE DRAWINGS

FIG. 2b is a section through the venturi-shaped chamber shown in FIG. 2a.

Although the drawings are described with reference to particular embodiments of the process and apparatus of this invention, it is to be noted that the embodiments described thereby are not intended as a limitation on the scope of the present invention. Many other modifications and embodiments will become apparent from the following description of the drawings and detailed description of the invention.

Figure 1:
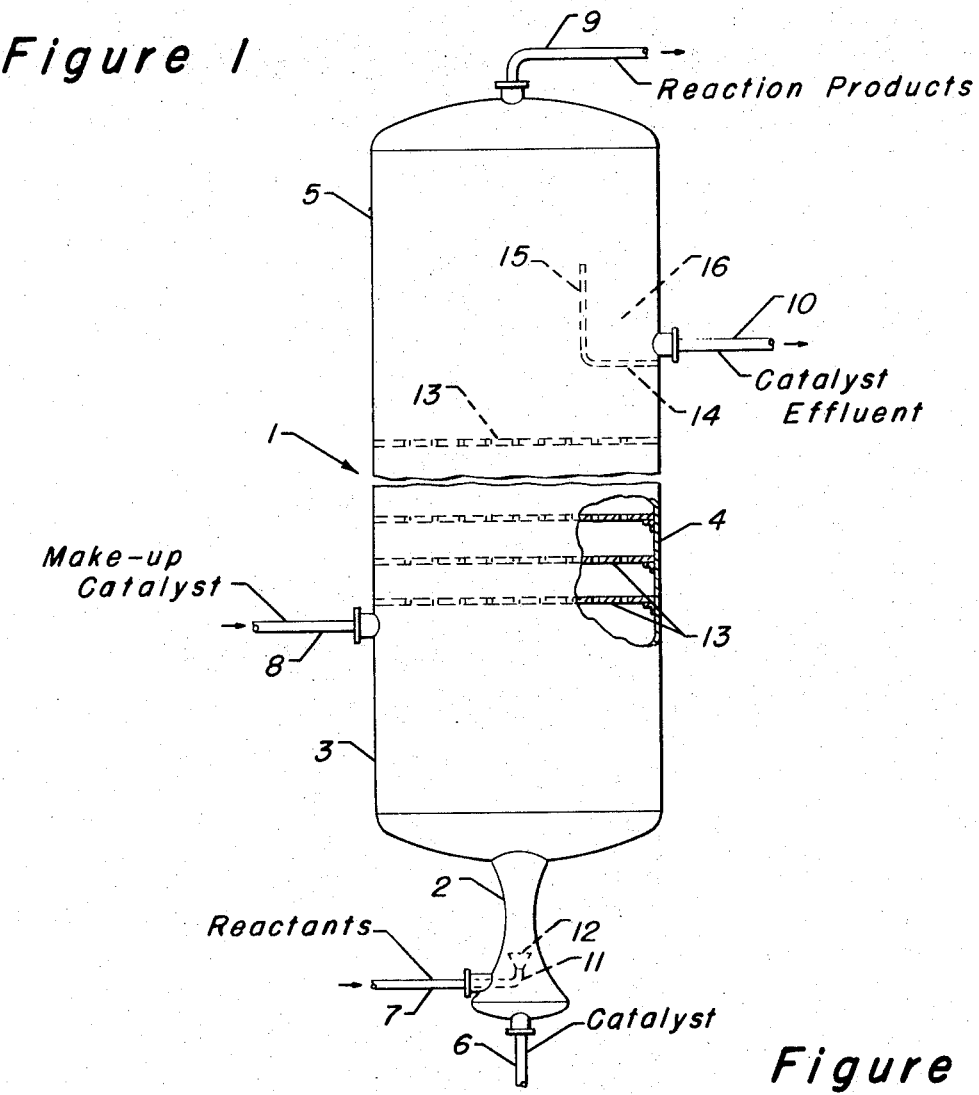
FIG. 1 is an elevational view of one embodiment of the alkylation apparatus of this invention.

Referring to FIG. 1, there is shown an embodiment of the alkylation apparatus of this invention, 1. A mixture of reactants is introduced into venturi-shaped chamber 2 through conduit 7, carried through conduit 11 to fluid distribution means 12, and introduced into a vertically flowing stream of catalyst which enters chamber 2 through conduit 6. The commingled reactants and catalyst flow vertically through chamber 2 into upstream retention chamber 3 and from chamber 3 into downstream retention chamber 4, which is provided with a plurality of vertically spaced perforated trays 13. Make up catalyst enters downstream retention chamber 4 through conduit 8, which is located at the upstream end of chamber 4. The make up catalyst is therein commingled with the reaction mixture which enters chamber 4 from chamber 3. The reaction mixture is passed from chamber 4 into settling chamber 5, where a heavier catalyst phase separates from a lighter reaction products phase which is comprised of the alkylation reaction product and unreacted reactants. The lighter reaction products phase is withdrawn from the top of settling chamber 5 through conduit 9 and further processed to separate and recover the alkylation reaction product. The catalyst phase collects in partially enclosed space 16 provided by horizontal baffle section 14 and weir 15, and is withdrawn from settling chamber 5 through conduit 10. The catalyst withdrawn through conduit 10 may be recycled to conduit 6 for further use.

Figure 2A:
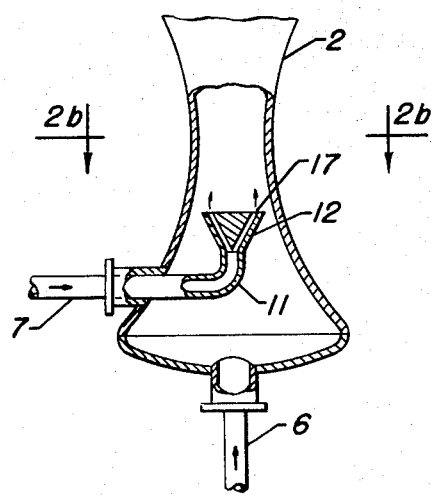
FIG. 2a is a sectional detail of the venturi-shaped chamber shown in FIG. 1.
Figure 2B:
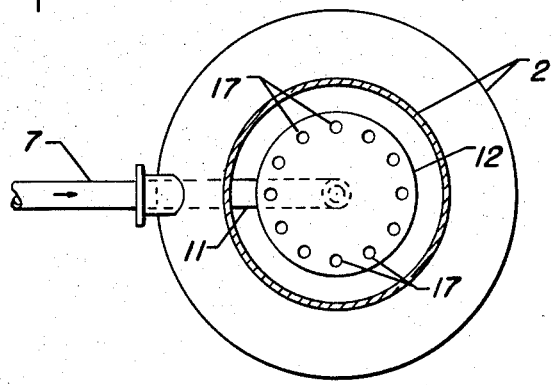

Referring now to FIG. 2a, a mixture of reactants is introduced into venturi-shaped chamber 2 by passing the mixture through a plurality of small diameter passageways in fluid distribution means 12. FIG. 2b shows the situation of fluid distribution means 12 within venturi-shaped chamber 2. The small diameter passageways 17 are uniformly distributed concentrically within chamber 2, to produce a uniform distribution of the reactants in the stream of catalyst flowing vertically through chamber 2. The passages 17 may impart a horizontal, as well as a vertical, component to the direction in which the streams of reactants are introduced into chamber 2.

Figure 2C:
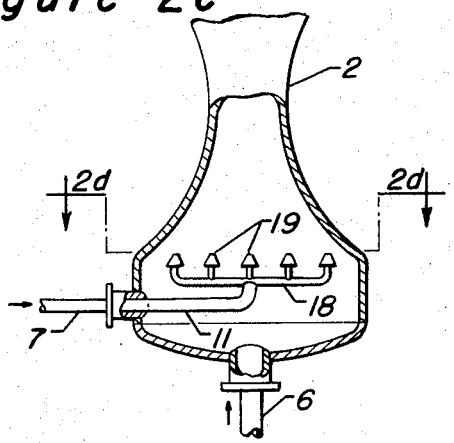
FIG. 2c is an elevational sectional view of another embodiment of the venturi-shaped chamber utilized in this invention.
Figure 2D:
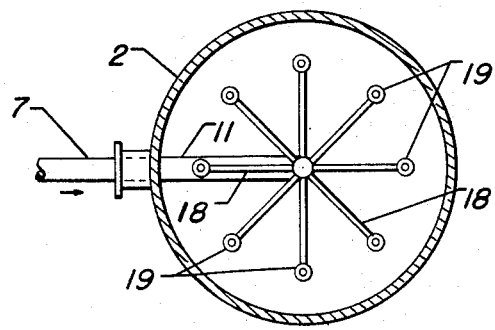
FIG. 2d is a section through the venturi-shaped chamber shown in FIG. 2c.

Referring to FIG. 2c, there is shown a different embodiment of the venturi-shaped chamber which is utilized in this invention. Catalyst is charged to venturi-shaped chamber 2 through conduit 6 and flows vertically through chamber 2. Reactants are charged to chamber 2 through conduit 7. They are then passed through conduit 11, in chamber 2, to distribution means 18, a plurality of conduits. Each of the plurality of conduits 18 is provided with a small diameter nozzle 19. The reactants pass through conduits 18 and nozzles 19 into chamber 2 and are carried vertically by the catalyst stream moving therethrough. FIG. 2d illustrates the placement of fluid distribution means 18 in chamber 2. The plurality of small diameter nozzles 19 is placed concentrically within chamber 2 in order to produce a uniform distribution of reactants in the vertically flowing catalyst stream.

Figure 3A:
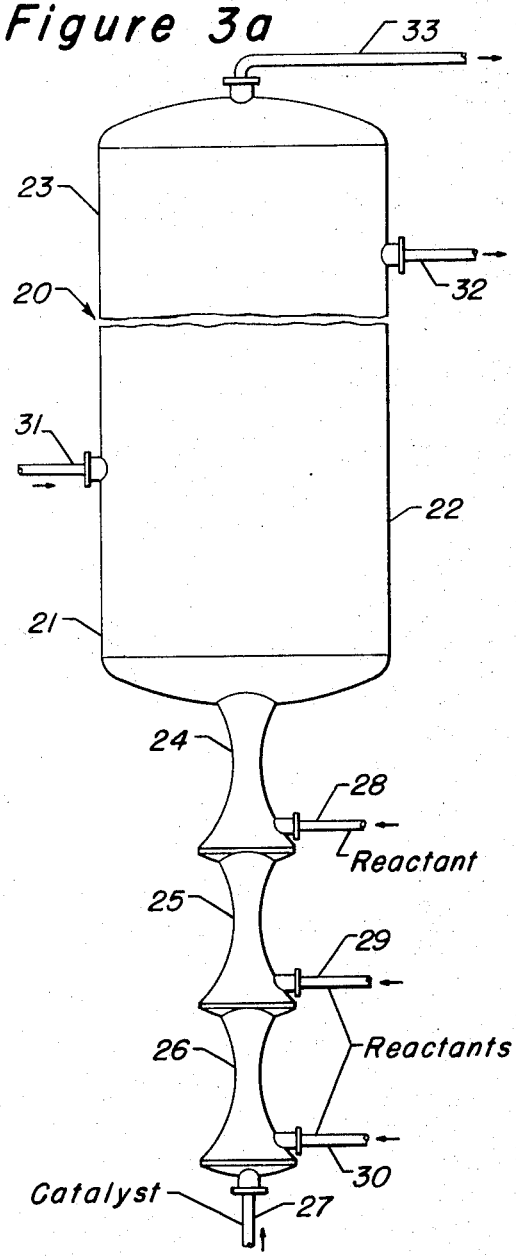
FIG. 3a is an elevational view of another embodiment of the alkylation apparatus of this invention.

Referring to FIG. 3a, there is shown another embodiment of the apparatus of this invention 20. Three venturi-shaped chambers 24, 25 and 26 are connected vertically in series catalyst flow. Catalyst is charged into venturi-shaped chamber 26 where it is commingled with a mixture of reactants which is introduced into chamber 26 through conduit 30. The commingled reactants and catalyst flow vertically into venturi-shaped chamber 25, where a second portion of the mixture of reactants is introduced through conduit 29, and commingled with the effluent from chamber 26. This mixture flows vertically into venturi-shaped chambers 24 where it is commingled with a third portion of reactants, introduced to chamber 24 through conduit 28. Venturi-shaped chambers 24, 25 and 26 are provided with fluid distribution means like that shown in FIG. 2a or like that shown in FIG. 2c. The effluent from chamber 24 flows vertically into upstream retention chamber 21 and then into downstream retention chamber 22, where it is combined with make up catalyst which enters chamber 22 through conduit 31. The effluent from chamber 22 flows vertically into settling chamber 23, where the lighter reaction products phase separates from the catalyst phase and is withdrawn through conduit 33. The catalyst phase is withdrawn through conduit 32.

Figure 3B:
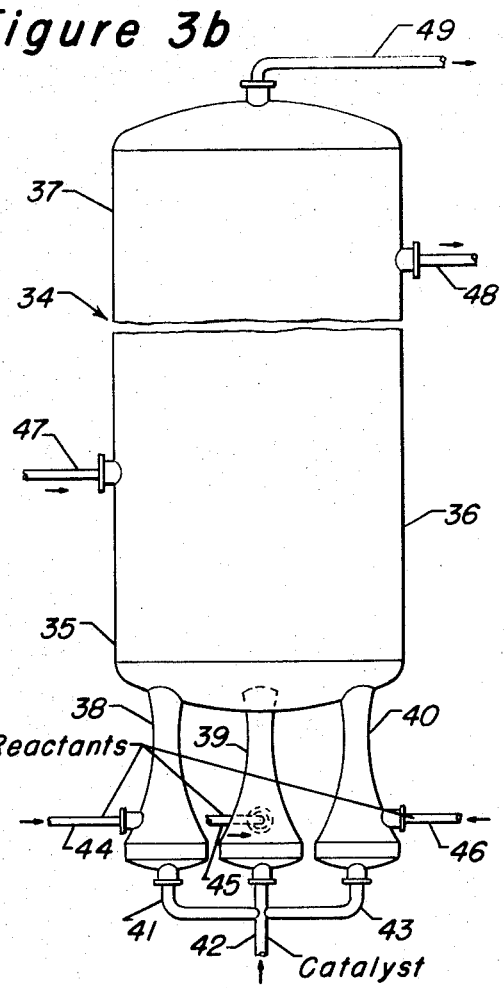
FIG. 3b is an elevational view of still another embodiment of the alkylation apparatus of this invention.

Referring to FIG. 3b, there is shown another embodiment of the alkylation apparatus of this invention 34. Three venturi-shaped chambers 38, 39 and 40 are connected in parallel flow to upstream retention chamber 35. Portions of catalyst are introduced into venturi-shaped chambers 38, 39 and 40 through conduits 41, 42 and 43 respectively. The portions of the catalyst flow vertically through chambers 38, 39 and 40 and are commingled with mixtures of reactants introduced into chambers 38, 39 and 40 through conduits 44, 45 and 46 respectively. The effluent from the three venturi-shaped chambers flows vertically directly into upstream retention chamber 35 and then into downstream retention chamber 36. Venturi-shaped chambers 38, 39 and 40 are provided with fluid distribution means like that shown in FIG. 2a or that shown in FIG. 2c. Make up catalyst is introduced into chamber 36 by conduit 47. The effluent from chamber 36 flows vertically directly into settling chamber 37, where the reaction products phase is separated from the catalyst phase. The reaction products phase is withdrawn from chamber 37 through conduit 49 and the catalyst phase is withdrawn through conduit 48.

DETAILED DESCRIPTION

The alkylatable reactant which can be utilized in the process of the present invention may be an alkylatable paraffinic hydrocarbon such as a $C_4$ or higher molecular weight branched paraffinic hydrocarbon. Isoparaffins are preferred, particularly isobutane. Other suitable alkylatable reactants include alkylatable aromatic hydrocarbons, alkylaromatic hydrocarbons, naphthenes, etc.

Olefin-acting reactants which may suitably be utilized in the present invention include $C_3$-$C_{30}$ olefinic hydrocarbons, alkyl halides, alcohols, alkyl sulfates, alkyl phosphate, etc. Mono-olefins are preferred, particularly propene, butenes and pentenes.

Catalysts suitable for use in the process of this invention include hydrogen halides, mineral acids such as sulfuric acid, phosphoric acid, etc., Friedel-Krafts metal halides such as aluminum chloride, zinc chloride, etc., boron fluoride, or appropriate mixtures thereof. A preferred hydrogen fluoride catalyst contains at least about 70 percent hydrogen fluoride, less than about 5 percent water, and less than about 30 percent hydrocarbons, or other materials, by weight. Particularly preferred is a hydrogen-fluoride catalyst comprising about 80 percent or more hydrogen fluoride and less than about 2 percent water by weight.

The temperature of the catalyst and the reactants when they enter the venturi-shaped chamber is within the range from about −100° F. to about 250° F., and preferably from about 0° F. to about 150° F. In embodiments of this process in which the alkylation reaction is exothermic, the desired temperature in the alkylation apparatus may be maintained by cooling the reactants, catalyst, or both, before they are charged to the venturi-shaped chamber. The desired temperature may also be maintained by indirect heat transfer means within the retention zone. For example, heat exchange tubes, through which cooling water is passed, may be located in the retention zone to absorb some, or all, of the heat of reaction.

The catalyst/reactants volume ratio of catalyst and reactants charged to the venturi-shaped chamber is within the range from about 1:10 up to about 10:1. In a particular embodiment wherein an isoparaffin is alkylated with an olefin, utilizing hydrogen fluoride catalyst, the volume ratio of catalyst to reactants charged is within the range from about 1:5 up to about 10:1. The residence time of the catalyst and the reactants in the venturi-shaped chamber, defined as the volume of the chamber divided by the volume of catalyst charged per minute, is in the range from about 0.1 second up to about 1 second. The residence time of the reaction mixture in the upstream retention chamber is in the range from about 0.1 minutes up to about 10 minutes. In the downstream retention chamber, the residence time of the reaction mixture is in the range from about 2 minutes up to about 20 minutes. The ratio of the volume of catalyst charged to the downstream retention chamber by the fluid inlet means thereof to the volume of reaction mixture charged thereto is between about 0 and about 1:10.

The upstream retention chamber may be provided with mixing means for maintaining a uniform distribution of components in the reaction mixture therein. Suitable mixing means include vertically spaced horizontal baffle sections, vertically spaced perforated trays, etc. Such mixing means may also be provided in the downstream retention chamber in order to retain the reaction mixture therein for a sufficient residence time, to maintain a uniform distribution of the components in the reaction mixture, and to admix the reaction mixture with the catalyst charged to the downstream retention chamber through the catalyst inlet means thereof.

Alkylation reaction conditions maintained in the venturi-shaped chamber and in the upstream and downstream retention chambers include a temperature of from about 0° F. to about 150° F. and a pressure of from about 1 atmosphere to about 40 atmospheres. When the process of this invention is performed in an embodiment utilizing isoparaffinic and olefinic reactants and hydrogen fluoride catalyst, it is preferable to maintain a temperature in the range from about −50° F. to about 150° F. and a pressure in the range from about 1 atmosphere to about 25 atmospheres. Preferably, reaction conditions are such as to maintain the reaction mixture components in the liquid phase.

Separation conditions in the settling chamber are essentially the same as the settling conditions disclosed in previously known alkylation processes. These conditions generally include a temperature and pressure sufficient to maintain the catalyst in the liquid phase, and to maintain the unused reactants and alkylation reaction product in the liquid or gaseous phases. In an embodiment of the process of this invention utilizing isoparaffin and olefin reactants and hydrogen fluoride catalyst, prefered separation conditions will generally include a temperature of from about 0° F. to about 200° F. and a pressure of from about 1 atmosphere to about 40 atmospheres.

The particular utility of embodiments of the apparatus of this invention wherein a plurality of venturi-shaped chambers is utilized, including those in which catalyst flows in series and those in which it flows in parallel through the plurality of venturi-shaped chambers, lies, in part, in the known fact that process conditions which are optimum for one alkylation reaction are not optimum for another similar alkylation reaction. For example, in a typical hydrogen fluoride-catalyzed alkylation process for producing a motor fuel alkylate, isobutane is alkylated with olefins comprising propene, 1- and 2-butene and isobutylene. The temperature, pressure, and reaction time which are optimum for the alkylation of isobutane with the butenes are not optimum for the alkylation of propene. In similar alkylation processes utilizing only butenes to alkylate isobutane, the conditions which are optimum for alkylating with one butene isomer are not optimum for alkylating with the other isomers. By charging different olefin-acting reactants to different venturi-shaped chambers while maintaining the different chambers at the optimum conditions for alkylating the particular reactants, the benefits of the optimum conditions may be obtained while the expense and inconvenience of multiple reaction chambers and separation chambers are obviated.

The critical period when the mixture of reactants initially contacts the catalyst in the venturi-shaped chamber is the point where the reaction conditions maintained are most important to providing a high yield of the desired alkylation reaction product and to eliminating undesirable side products. High concentrations of reactants, particularly the olefin-acting reactant, in the catalyst phase favor the formation of undesirable side products. In the time before the reaction mixture becomes fairly uniform in composition, the product of the process will not be as high quality as when the reactants are intially dispersed uniformly into the catalyst phase. The process and apparatus of this invention provide a method for initially dispersing the reactants into the catalyst in a fluid-catalyzed alkylation process. Also, when different reactants are initially charged to different venturi-shaped chambers, the benefits of optimum reaction conditions for particular reactants are provided during the critical period when the reactants initially contact the catalyst. For example, when catalyst flows in parallel to multiple venturi-shaped chambers, the temperature of the catalyst charged to the various chambers may be maintained at optimum levels for particular reactants charged to the same chambers. When different reactants are charged to venturi-shaped chambers through which catalyst flows in series, the temperature of the reactants charged to various chambers can be maintained at a level to provide optimum reaction conditions for that reactant. In an embodiment where catalyst flows in series, the temperature of the catalyst and reaction mixture will increase as the catalyst flows downstream. Thus, reactants which require a lower optimum temperature for reaction may be charged to upstream venturi-shaped chambers while reactants which require a higher optimum temperature for reaction may be charged to downstream chambers. For example, butenes may be charged to an upstream venturi-shaped chamber while propene is charged to a downstream venturi-shaped chamber when these are utilized as olefin-acting reactants. It has been found that propylene alkylates more efficiently at a higher temperature than do butenes. When the butenes are introduced upstream of the propene, they react to release heat which raises the temperature of the reaction mixture to a level optimum for alkylation of propene. The propene introduced downstream, therefore, encounters optimum reaction conditions provided by the heat of reaction of the butenes, while the butenes may be reacted, initially, at a lower temperature optimum for the alkylation reaction in which they take part.

I claim as my invention:

1. A process for producing an alkylation reaction product from an alkylatable reactant and an olefin-acting reactant, utilizing hydrogen fluoride catalyst, which comprises the steps of:
   a. introducing said catalyst into the lower end of a vertically disposed venturi-shaped chamber maintained at alkylation reaction conditions and passing said catalyst vertically through said venturi-shaped chamber;
   b. introducing said reactants into the vertically flowing catalyst stream in the lower end of said venturi-shaped chamber at a vertical velocity less than the vertical velocity of said catalyst in said venturi-shaped chamber;
   c. passing the effluent from said venturi-shaped chamber directly into a vertically extended retention chamber maintained at alkylation reaction conditions, said venturi-shaped chamber being in direct communication with the bottom of said retention chamber;
   d. passing the alkylation reaction effluent from said retention chamber directly into a vertically extended settling chamber, said settling chamber extending vertically from said retention chamber, and separating said effluent therein into a hydrocarbon phase and a catalyst phase; and,
   e. separately withdrawing said hydrocarbon phase and said catalyst phase from said settling chamber and recovering said product from said hydrocarbon phase.

2. The process of claim 1 further characterized in that said catalyst and said reactants are introduced into at least two vertically disposed venturi-shaped chambers maintained at alkylation reaction conditions and in direct communication with said retention chamber.

3. The process of claim 1 further characterized in that said catalyst is passed vertically through at least one lower venturi-shaped chamber maintained at alkylation reaction conditions and in direct communication with an upper venturi-shaped chamber, said upper venturi-shaped chamber being in direct communication with the bottom of said retention chamber.

4. The process of claim 1 further characterized in that said alkylatable reactant is a $C_4 - C_6$ isoparaffinic hydrocarbon.

5. The process of claim 1 further characterized in that said olefin-acting reactant is a $C_3 - C_5$ mono-olefinic hydrocarbon.

6. The process of claim 1 further characterized in that said olefin-acting reactant is a $C_3 - C_5$ alkyl halide.

* * * * *